United States Patent [19]

Gutermuth et al.

[11] 4,175,935
[45] Nov. 27, 1979

[54] PLANAR CONDENSOR ARRAY OF HOLLOW INTERLEAVED PROFILES

[76] Inventors: Paul Gutermuth, Augustastrasse 48, D-6456 Langenselbold, Fed. Rep. of Germany; Oetjen Heinrich, August-Bebel-Strasse 11, D-6451 Bruchkobel, Fed. Rep. of Germany; Paul Gutermuth, Jr., Augustastrasse 48, D-6456 Langenselbold, Fed. Rep. of Germany

[21] Appl. No.: 834,021

[22] Filed: Sep. 16, 1977

[30] Foreign Application Priority Data

Sep. 16, 1976 [DE] Fed. Rep. of Germany ....... 2641765

[51] Int. Cl.² .................. B01D 5/00; B01D 35/18; B01D 45/06
[52] U.S. Cl. .................................. 55/269; 55/440; 55/443; 55/464; 165/61
[58] Field of Search ............... 55/269, 444, 209, 282; 165/136, 61

[56] References Cited

U.S. PATENT DOCUMENTS

| | | | |
|---|---|---|---|
| 705,015 | 7/1902 | Barrath | 165/136 |
| 722,272 | 3/1903 | Baker | 55/444 X |
| 997,762 | 7/1911 | Derrig | 55/269 |
| 1,044,208 | 11/1912 | Luhn | 55/444 X |
| 2,463,782 | 3/1949 | Leischner | 165/61 X |
| 2,575,489 | 11/1951 | Chace et al. | 165/136 X |
| 2,617,393 | 11/1952 | Peters | 165/136 X |
| 3,470,678 | 10/1969 | Clark et al. | 55/269 |
| 3,815,336 | 6/1974 | Rigo | 55/269 |
| 3,854,909 | 12/1974 | Hoisington et al. | 55/269 X |
| 4,002,198 | 1/1977 | Wagner et al. | 55/269 X |
| 4,099,941 | 7/1978 | Gutermuth et al. | 55/269 |
| 4,101,299 | 7/1978 | Bertucci | 55/269 X |

FOREIGN PATENT DOCUMENTS

| | | | |
|---|---|---|---|
| 622850 | 12/1935 | Fed. Rep. of Germany | 55/269 |
| 2130632 | 12/1971 | Fed. Rep. of Germany | 165/61 |

Primary Examiner—Kathleen J. Prunner
Attorney, Agent, or Firm—Sughrue, Rothwell, Mion, Zinn and Macpeak

[57] ABSTRACT

A planar condensor array 10 comprises two rows 12, 14 of generally U-shaped, hollow, alternately disposed, interleaved elements 16 disposed transversely to a flow of gas 18 containing condensable contaminants and/or entrained particles. A cold fluid is supplied to the elements to promote condensation and precipitation, and when a surface layer builds up a hot fluid is supplied to "thaw" and drain the layer in a self-cleaning manner.

3 Claims, 8 Drawing Figures

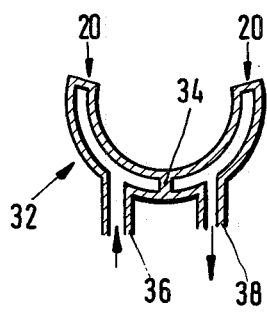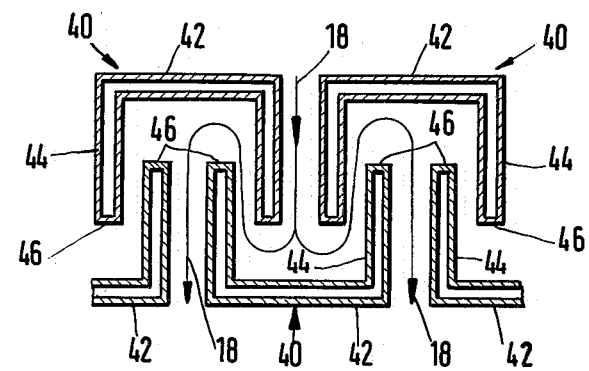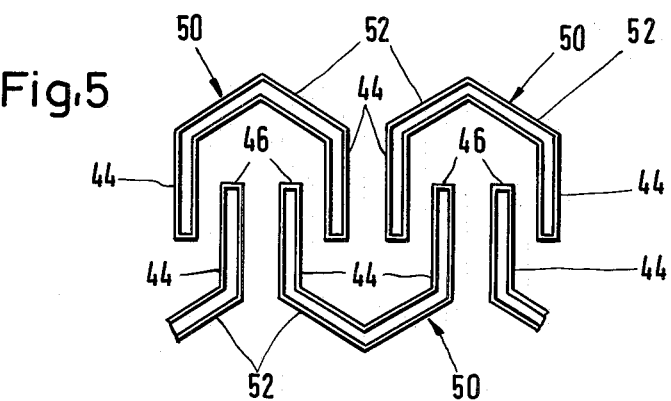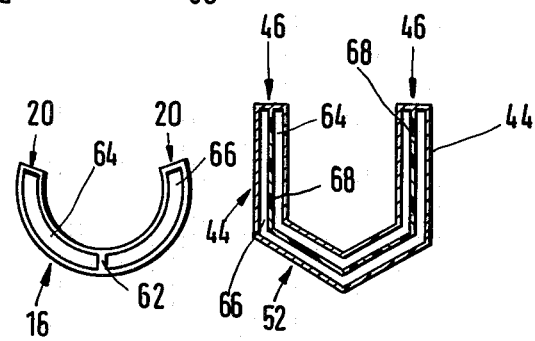

PLANAR CONDENSOR ARRAY OF HOLLOW INTERLEAVED PROFILES

BACKGROUND OF THE INVENTION

This invention relates to a planar array of hollow, curved, alternately interleaved profile elements for separating condensable portions of a gaseous flow.

In many fields it is absolutely necessary to separate moist components or entrained particles from a mixture of air, steam, vapor, mist or the like in such a manner that the gaseous carrier can be re-used.

In damp working rooms, vapors very often arise with aromatic parts or with fat particles entrained in a vapor phase. Very often intensive odors stick to such rooms due to these components, and the problem to be solved is to separate these components in order to free the rooms from odors or to make available again the air in which the particles are contained.

It is known to precipitate steam or gas mixtures or condensable components contained in the air on sheet-like structures and thus to separate them. On the surface, the precipitation forms a layer which reduces the condensation effect during operation, and in most cases complicated steps are required in order to remove this surface layer. These disadvantages are overcome by the invention.

SUMMARY OF THE INVENTION

According to this invention, a planar element array is transversely arranged with respect to the gas flow and is composed of at least two rows of groovelike hollow sections whose free longitudinal edges are interleaved or overlapped, and in the hollow sections fluid of adjustable temperature flows.

The fluid within the hollow sections, e.g. water or a gas or any other suitable fluid, is at first supplied at a very low temperature during an operating phase during which a condensing of entrained components is necessary or desired, in order to enhance the condensation. In a subsequent operating phase, however, a warm or hot fluid is supplied to "thaw off" the precipitation or to melt it in such a manner that it will easily drain from the outer skin of the sections. In this manner the array can, for example, be used in air-conditioning systems for large canteens in order to eliminate fat particles or aromatic substances from the room air. During a frying or cooking phase the array is cooled in order to promote precipitation, and during a subsequent cleaning phase the element is warmed up in order to implement a self-cleaning process.

BRIEF DESCRIPTION OF THE DRAWINGS

In the drawings:

FIG. 3 is a modified inner arrangement of a hollow profile in a schematic sectional view;

FIG. 4 is a modified design of the hollow profiles in schematic sectional view;

FIG. 5 is another modification, and

FIGS. 6A-6C each show three other possible designs of the hollow profiles.

DETAILED DESCRIPTION OF THE PREFERRED EMBODIMENTS

Figure 1:
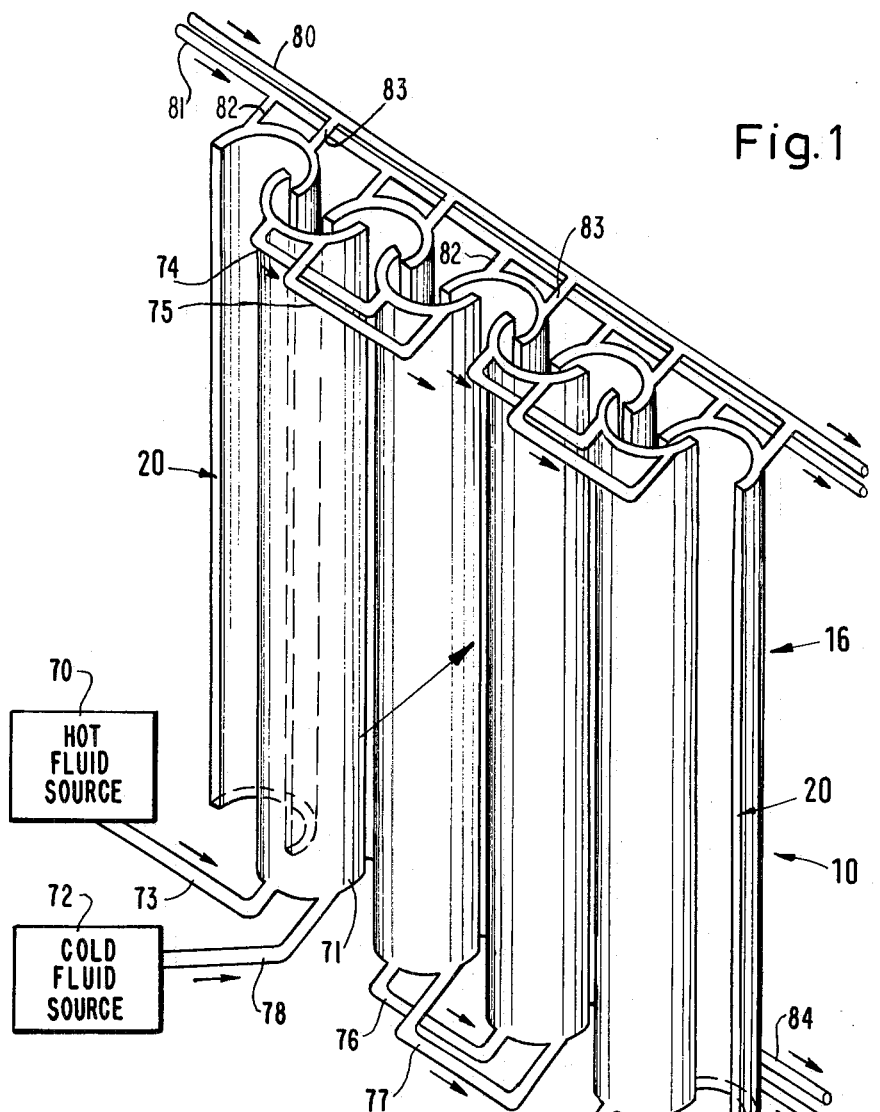
FIG. 1 is a schematic perspective view of a planar element array according to the invention.
Figure 2:
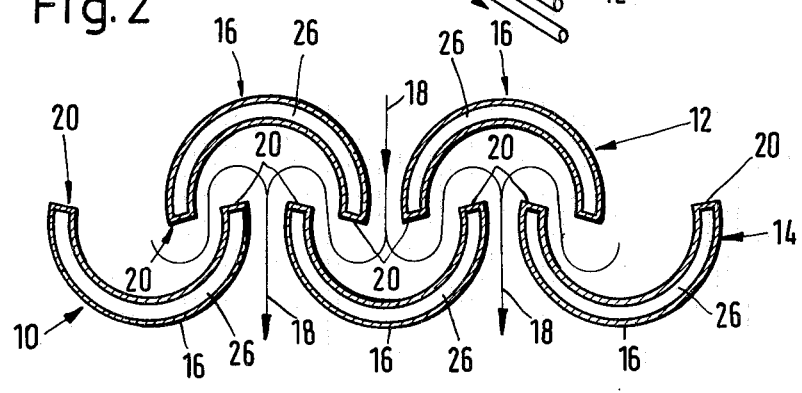
FIG. 2 is a schematic sectional view of the array.

In FIGS. 1 and 2 a planar element array 10 is shown consisting of two rows 12 and 14 of groovelike hollow profiles 16. A gas with condensable components or with particles that can be precipitated is blown through the array 10 in the direction of the arrows 18.

The individual hollow profiles 16 in row 12 are arranged opposite those in row 14 in such a manner that their inner longitudinal edges 20 point to the inner curve of the opposite hollow profiles 16. Therefore, moving along an imaginary center line of the array 10 the adjacent longitudinal edges 20 of two adjacent profiles 16 in one row 12 always overlap the longitudinal edges 20 of an adjacent profile in the opposite row 14.

As concerns the hollow profile grooves according to FIGS. 1 to 3, the radii of the curves need not be equal. For example, it is possible to give the same curve radius to all profiles 16 in the row 12, whereas the profiles 16 in the opposite row 14 may have a more flattened-out curve than the one shown so that the distances between adjacent longitudinal edges 20 vary. It is also possible to use differently curved profiles 16 in a given row in order to vary the distances thereby and it is possible to vary the distances between adjacent longitudinal edges 20 at random.

FIG. 1 shows the connections of the internal fluid for the array 10 with the elements of row 12 connected in series and the elements of row 14 connected in parallel. The flow directions of fluid have been indicated by arrows. The elements of each row can be connected in parallel or series as desired, FIG. 1 including an example of each for purposes of illustration. The individual elements shown in FIG. 1 are of generally the same type as that shown in FIG. 6C with an insulating partition wall in each element which separates the elements into two chambers. Any of the other embodiments of the elements could of course be used as well with the fluid connection arranged accordingly. As shown, fluid flows from hot fluid source 70 through feed line 73 into the lower end of one chamber of element 71. The fluid flows upward and emerges from the top of the chamber flowing through line 74 to the adjacent element where it flows downward. At the lower end of the adjacent element, the fluid flows through line 76 to the next adjacent element. This connection and flow pattern is continued through the remaining elements in the array. Similarly, fluid emerging from cold fluid source 72 flows through feed line 78 to the second chamber of element 71, upward through the second chamber to line 75 which conveys it to the second chamber of the adjacent element where it flows downward. At the lower end of the adjacent element, the fluid flows through line 77 to the next adjacent element.

Alternately, the elements of a row can be coupled in parallel as shown for row 14. Fluid flows through upper lines 80 and 81, carrying hot and cold fluid respectively, to outlets 83 and 82 connecting them to the upper portions of the two chambers. Fluid emerges at the bottom of the chambers flowing out through lines 84 and 85 which are coupled to the elements in the same manner as lines 80 and 81. Of course, the opposite direction of flow can also be used.

According to the embodiment of FIG. 3 it is also possible to supply the fluid via an inlet 36 to a hollow profile 32 having a partition wall 34 only at one end of the profile, while at the other end of the profile the partition wall is interrupted or opened to divert the fluid around the partition, so that the fluid is carried off via the outlet 38.

In FIGS. 4 and 5 modified embodiments of the groovelike hollow profiles are shown to illustrate that the grooves can be of any configuration, even departing from the curve shape. In FIG. 4, angular U-shaped hollow profiles 40 comprise a part 42 extending in the plane of the array 10 and two vertically projecting limbs 44. However, the angles at which the limbs 44 project can be chosen at random, as well as the distances of the longitudinal edges 46 and the lengths of the parts 42 and the limbs 44.

The example according to FIG. 5 illustrates that one can also use U-shaped hollow profiles 50 with a V-shaped groove bottom 52, a type of construction that is also represented in FIGS. 6a and 6c.

In FIG. 6 there are shown modified designs for hollow profiles with several fluid chambers. The outer shape of FIG. 6a resembles the embodiment according to FIG. 5. In the free limbs 44 and in the V-shaped groove bottom 52 several chambers are divided by partition walls 62 in such a manner that the chambers 64 can be supplied with a cold fluid and the chambers 66 with a warm fluid.

In the example of FIG. 6b a partition wall 62 separates two chambers 64 and 66 from each other, and FIG. 6c shows an embodiment with a partition wall 68 running parallel to the outer walls, offering two chambers 64 and 66.

The partition walls 34, 62 and 68 may be made of either heat-conducting or heat-insulating material depending upon whether or not it is desired to maintain a temperature differential between the fluids flowing in the chambers on either side of a partition wall.

If during the condensing operation while admitting a cold fluid, ever increasing condensate layers are settling between the longitudinal edges 20 or 46, or between the adjacent limbs 44, then it is easily possible to admit for a short time a warm fluid to the hollow profiles or chambers of the profiles in order to let the layers "thaw off" and then drain off. Several arrays can also be disposed in a parallel manner so that an alternate operation can be effected without necessitating any interruption. In addition, the arrays can be configured in the form of easily exchangeable boards, which thus can easily be made as part of an installation, an apparatus or a device. It is likewise possible, e.g. to make a board for a ventilating air dome according to the invention, as well as to construct a complete subceiling for room conditioning in industrial damp rooms of slaughter houses, laundries or in the chemical industry, by means of these new arrays.

We claim:
1. A self-cleaning apparatus for condensing gaseous contaminants and/or precipitating particles entrained in a flowing gaseous mixture, comprising:
    (a) a generally planar condensor array disposed with the plane of the array substantially perpendicular to a flow direction of the gaseous mixture,
    (b) said array comprising first and second rows of generally U-shaped, hollow, alternately interleaved, spaced profile elements disposed such that the free edges of the elements in the first row overlap the free edges of the elements in the second row so that the gaseous mixture flows into the array through the spaces between the elements in the first row thereof and is deflected by the elements of the second row towards the elements of the first row and out of the array through the spaces between the elements in the second row thereof,
    (c) an internal heat insulating partition wall within each of said hollow elements, each of said walls being of the same U-shape as said elements to divide the interiors of said elements into two separate chambers,
    (d) means for supplying to one of the separate chambers in each of said hollow elements a fluid at a sufficiently low temperature to form a condensate on the element wall portions in contact with said one of the separate chambers, and
    (e) means for supplying to the other of said separate chambers in each of said hollow elements a fluid at a sufficiently high temperature to melt off any condensate on the element wall portions in contact with said other of said separate chambers.

2. An apparatus according to claim 1, further comprising means for connecting the means for supplying fluid at a sufficiently low temperature to the interiors of each of said one of the separate chambers in each row such that the hollow elements of the same row are connected in parallel, and means for connecting the means for supplying fluid at a sufficiently high temperature to the interiors of each of said other of said separate chambers in each row such that the hollow elements of the same row are connected in parallel.

3. An apparatus according to claim 1, further comprising means for connecting the means for supplying fluid at a sufficiently low temperature to the interiors of each of said one of the separate chambers in each row such that the hollow elements of the same row are connected in series, and means for connecting the means for supplying fluid at a sufficiently high temperature to the interiors of each of said other of said separate chambers in each row such that the hollow elements of the same row are connected in series.

* * * * *